C. H. DRIVER & A. H. GOETZ.
POWER HACKSAW.
APPLICATION FILED NOV. 15, 1917.
1,296,933.
Patented Mar. 11, 1919.
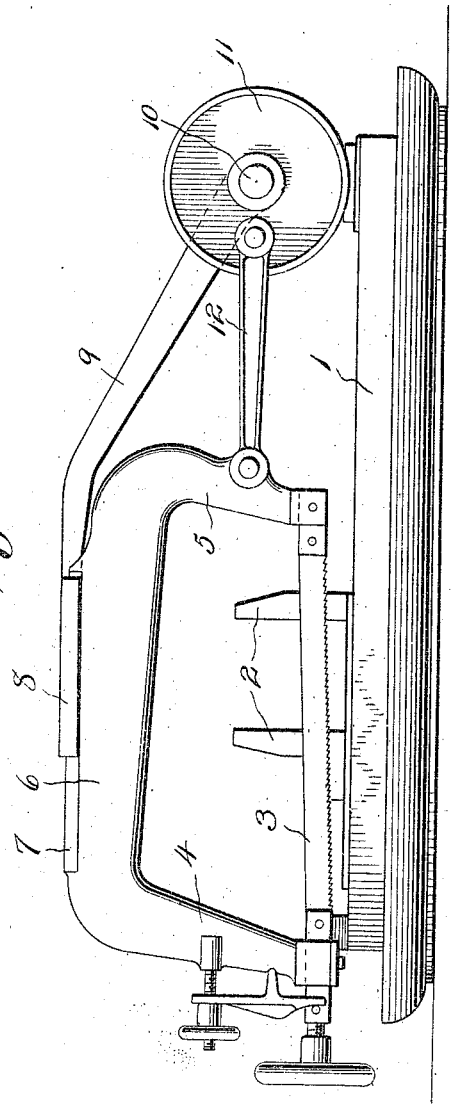
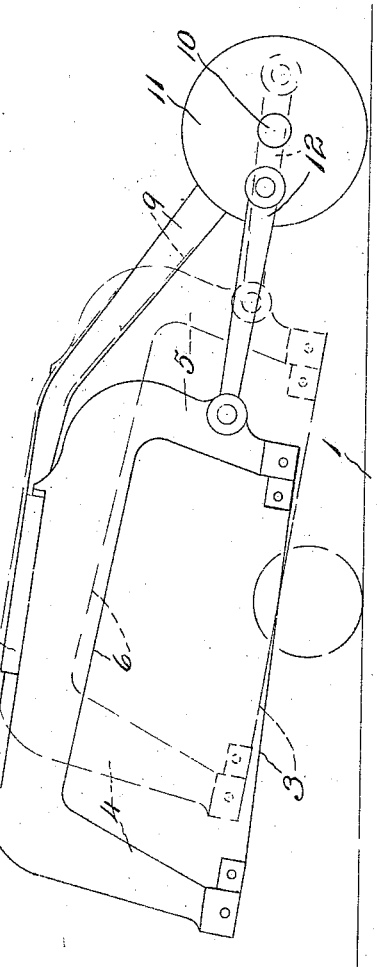
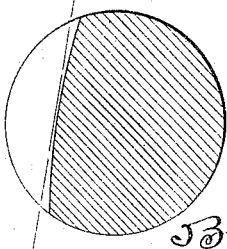
Witness:
T. P. Britt
Inventors
Charles H. Driver
Arthur H. Goetz
By Geo. d. Young
Attorney

UNITED STATES PATENT OFFICE.

CHARLES H. DRIVER, OF RACINE, AND ARTHUR H. GOETZ, OF MUKWONAGO, WISCONSIN, ASSIGNORS TO J. MOORES JONES, OF RACINE, WISCONSIN.

POWER-HACKSAW.

1,296,933.   Specification of Letters Patent.   Patented Mar. 11, 1919.

Application filed November 15, 1917. Serial No. 202,164.

*To all whom it may concern:*

Be it known that we, CHARLES H. DRIVER and ARTHUR H. GOETZ, both citizens of the United States, and residents of Racine, in the county of Racine and State of Wisconsin, and of Mukwonago, in the county of Waukesha and State of Wisconsin, respectively, have invented certain new and useful Improvements in Power-Hacksaws; and we do hereby declare that the following is a full, clear, and exact description thereof.

Our invention refers to new and useful improvements in metal and other material cutting machines, and more particularly to power hack saws.

It is obvious to any observer that it is much easier to saw a piece of material when the surface engaged by the saw blade is small than when said surface is of considerable extent, and it is also evident that cutting under the former circumstances will be much more rapid than under the latter. Therefore, a machine, which is so constructed that its cutting blade will always engage at one time only a very small percentage of the entire surface to cut, will be much more efficient and will require less energy than machines of the usual construction.

Thus it is a principal object of the present invention to produce a machine in which the angle of inclination of the cutting edge of the saw blade with respect to the work material will be continuously changed during the cutting stroke of said blade.

Another common defect in the operation of hack saws having substantially U-shaped blade holders is that they "chatter". The result of this is to render the blade less efficient inasmuch as it will not at all times remain in contact with the work material. It is therefore a secondary object of the invention to improve upon the construction of blade holding yokes to eliminate "chattering".

With these and other objects in view, the invention resides in the novel features of construction, combination and arrangement of parts, which will be hereinafter more particularly described and claimed, and shown in the drawing wherein:—

Figure 1 represents a side elevational view of the portions of a power hack saw with which the improvements of the present invention are combined.

Fig. 2 is a diagrammatic view showing two positions of the blade and its holder for the purpose of illustrating the changes in position of these parts at their extremes of movement, and Fig. 3 is a detail sectional view of a piece of round stock, which has been partially cut by a machine constructed in accordance with our invention.

Referring more particularly to the drawing, it will be seen that the numeral 1 designates the work support of a power hack saw and that the material to be cut is held on this part by jaws 2. The blade 3 for cutting the work material is removably held in the free end of arms 4 and 5 of a blade holding yoke 6, which, as will be evident from the drawing, is substantially inverted U-shaped.

The upper edge of the back of the yoke 6, which is disposed substantially vertical, is provided with a track 7 for sliding movement in a guide 8. This guide is provided with an arm 9 which is pivoted upon a driven shaft 10. As is usual with devices of this character, the pivotal connection between the blade holding yoke and the shaft 10 allows the blade 3 to be readily adjusted for any size piece of work material. As the saw cuts into the work material the blade holding yoke is automatically lowered by gravity, or in some instances by a positive feed, to retain the cutting edge of the blade in contact with the work.

The means for reciprocating the blade holding yoke with its blade is obtained by means of a crank plate 11 fixed to the driven shaft 10 and a pitman 12, which forms a connection between said plate 11 and the arm 5 of the yoke. The saw blade is preferably disposed in the yoke in such a manner that it will cut upon the back stroke of the blade holding yoke, or in other words, when the latter moves toward the shaft 10.

The principal object of the invention is procured merely by disposing the saw blade 3 out of parallel with the plane of the axis of the guide 8. Thus from Fig. 1 it will be seen that the inner end of said blade is closer to the plane of the axis of the guide than the outer end. This positioning of the saw blade, together with the pivotal connection between the blade holding yoke and the shaft 10, causes the cutting edge of the blade to move in an arc, that is to say, the angle of inclination of said cutting edge with respect to the work is continually changing during the cutting stroke of the machine. The principal reason for this is that as the blade holding yoke moves toward the shaft 10, the inclination of the cutting edge of the blade will cause the guide 8 to be moved away from the work.

The direct result of this peculiar movement is that the work material is cut on an arc, as will be seen from Fig. 3, and in this manner the cutting edge of the blade will only engage at one time a fraction of the total surface to be cut. As shown in Fig. 3, the plane of the edge of the blade is substantially tangential to the arc of the cut. The diagrammatic view in Fig. 2 illustrates the manner in which the blade changes its position as it moves from one extreme of movement to the other. By engaging only a fraction of the cut surface of the work, friction between such work and the blade is reduced to a minimum. Experiment has proven that with this arrangement a piece of work material may be cut in approximately one-half the time it would take to cut the same piece of material with a machine in which the plane of the axis of the guide and the plane of the cutting edge of the blade are parallel.

The machine is further improved by changing the angles of the arms 4 and 5 of the blade holding yoke with respect to the plane of the axis of the guide. Ordinarily these arms are at right angles to such plane, and as a result the blade tends to "chatter" and the efficiency thereof is decreased. We have discovered that "chattering" is eliminated by inclining both of the arms 4 and 5 downwardly and rearwardly from the back of the yoke.

When these two improvements are combined, an extremely efficient hack saw machine is produced and one which will render much better service in the same length of time, or less, than similar machines at present on the market.

We claim:—

1. A device of the class described comprising a blade holder in the form of a yoke, and a blade connected with the free ends of the arms of said yoke, both arms of said yoke being extended from the back thereof downwardly and rearwardly with respect to the cutting direction of the blade.

2. A device of the class described comprising a blade holder, a guide, said blade holder being reciprocative in the guide, means for moving the blade holder, and a blade carried by the holder, said blade being disposed at an angle to the plane of the axis of the guide.

3. A device of the class described comprising a blade holder, a guide having one end pivoted, said blade holder being reciprocative in the free end portion of the guide, means for reciprocating the blade holder, and a blade carried by the holder, said blade being disposed out of parallel with the plane of the axis of the guide.

4. A saw machine including an arm pivotally mounted at one end, a blade holder slidably carried by the other end of the arm, a blade secured to the blade holder with its cutting edge oblique to the direction of sliding movement of the blade holder with respect to the arm, and means for reciprocating the blade holder.

In testimony that we claim the foregoing, we have hereunto set our hands at Milwaukee, in the county of Milwaukee, State of Wisconsin, and at Philadelphia, county of Philadelphia, and State of Pennsylvania, respectively.

CHARLES H. DRIVER.
ARTHUR H. GOETZ.

Copies of this patent may be obtained for five cents each, by addressing the "Commissioner of Patents, Washington, D. C."